(12) United States Patent
Bender et al.

(10) Patent No.: US 11,585,470 B2
(45) Date of Patent: Feb. 21, 2023

(54) FORMED PIPE END-SECTION OF A PIPELINE AND PIPE SCREW-CONNECTION

(71) Applicant: Eaton Intelligent Power Limited, Dublin (IE)

(72) Inventors: Pierre Bender, Gernsbach (DE); Eric Scherer, Oetigheim (DE)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 114 days.

(21) Appl. No.: 16/634,903

(22) PCT Filed: Jul. 30, 2018

(86) PCT No.: PCT/EP2018/070586
§ 371 (c)(1),
(2) Date: Jan. 29, 2020

(87) PCT Pub. No.: WO2019/025362
PCT Pub. Date: Feb. 7, 2019

(65) Prior Publication Data
US 2020/0232587 A1 Jul. 23, 2020

(30) Foreign Application Priority Data
Jul. 31, 2017 (GB) .................................... 1712236

(51) Int. Cl.
*F16L 19/02* (2006.01)
*F16L 19/028* (2006.01)

(52) U.S. Cl.
CPC ......... *F16L 19/0218* (2013.01); *F16L 19/028* (2013.01)

(58) Field of Classification Search
CPC . F16L 19/0218; F16L 19/028; F16L 19/0283; F16L 9/006
USPC ......................................................... 285/354
See application file for complete search history.

(56) References Cited

U.S. PATENT DOCUMENTS

| | | | |
|---|---|---|---|
| 4,801,160 A * | 1/1989 | Barrington | F16L 19/0218 285/354 |
| 5,192,095 A | 3/1993 | Behrens | |
| 6,431,613 B1 * | 8/2002 | Altenrath | F16L 19/028 285/354 |
| 2002/0101079 A1 * | 8/2002 | Ehrke | F16L 19/028 285/354 |
| 2002/0190523 A1 | 12/2002 | Berghaus | |
| 2004/0145183 A1 | 7/2004 | Wasmuth | |

(Continued)

FOREIGN PATENT DOCUMENTS

| CN | 103016863 A | 4/2013 |
|---|---|---|
| DE | 4328877 A1 | 3/1995 |

(Continued)

*Primary Examiner* — Zachary T Dragicevich
(74) *Attorney, Agent, or Firm* — Leydig, Voit & Mayer, Ltd.

(57) ABSTRACT

A formed pipe end-section of a pipeline for connecting the pipeline at an end includes: an annular bead with a first abutment face facing away from the end of the pipeline and a second abutment face facing towards the end of the pipeline; a chamfer reducing a diameter of the pipe end-section from the annular bead towards the end of the pipeline; and a radial recess for accommodating a sealing ring. The chamfer extends at least between the annular bead and the radial recess.

11 Claims, 1 Drawing Sheet

(56) References Cited

U.S. PATENT DOCUMENTS

2010/0127493 A1* 5/2010 Felder .................. F16L 19/028
2010/0140920 A1   6/2010 Kloss et al.
2015/0292654 A1  10/2015 Bottcher et al.

FOREIGN PATENT DOCUMENTS

| DE | 20204506 U1 * | 5/2002 | ............ F16L 19/028 |
| DE | 20204506 U1 | 5/2002 | |
| EP | 0456377 A2 | 11/1991 | |
| GB | 2288996 A | 11/1995 | |
| JP | 2010031941 A | 2/2010 | |

* cited by examiner

--Prior Art--

FORMED PIPE END-SECTION OF A PIPELINE AND PIPE SCREW-CONNECTION

CROSS-REFERENCE TO PRIOR APPLICATIONS

This application is a U.S. National Phase application under 35 U.S.C. § 371 of International Application No. PCT/EP2018/070586, filed on Jul. 30, 2018, and claims benefit to British Patent Application No. GB 1712236.7, filed on Jul. 31, 2017. The International Application was published in English on Feb. 7, 2019 as WO/2019/025362 under PCT Article 21(2).

FIELD

The invention refers to a formed pipe end-section of a pipeline for connecting the pipeline at an end and to a pipe screw-connection for reversibly connecting a pipeline having a formed pipe end-section to an adapter having a front face at a connecting end and an inner cone extending from the front face, the adapter forming a tubular member for passing through a medium.

BACKGROUND

Pipeline connections are supposed to become possible with such formed pipe end-section of the pipeline. The pipeline, particularly a metallic one, is supposed to be connected to a connecting adapter that has an accommodating opening for the pipeline. The pipeline comprises the formed pipe end-section adjacent to its end. A coupling nut attached to the formed pipe end-section is screwed onto the connecting adapter to ensure that the adapter is drawn towards the pipe end-section and is held tightly there in screwed-on form.

Such a concept is known, for example, from British Standard BS5200, which refers to 60° cone fittings, which typically serve as connection adapters on hydraulic systems. The connection is sealed by metal-to-metal line contact between the conical surface of the internal seal and a corresponding surface on the mating component. It is a drawback, however, that forming the adapter counterpart geometry of the pipe end-section out of a steel pipeline end, in regard of the BS5200 dimensions, requires more steel material than the suitable pipeline sizes are offering. An example of the state of the art is shown in FIG. 1. Each connecting size is directly related to a certain tube size. The respective relations are described in the related standards. It is therefore defined, which tube size shall get applied for which connecting end. For example, a 10 mm tube must be used to create the geometry of the formed pipe end-section according to BS5200. The problem is, however, that this 10 mm tube is offering too less material to achieve the BS5200 geometry and the related sealing function on the 60° cone. Additionally, the material flow during the forming process is reducing the material properties such as, for example, tensile strength and pressure resistance.

SUMMARY

In an embodiment, the present invention provides a formed pipe end-section of a pipeline for connecting the pipeline at an end, comprising: an annular bead with a first abutment face facing away from the end of the pipeline and a second abutment face facing towards the end of the pipeline; a chamfer reducing a diameter of the pipe end-section from the annular bead towards the end of the pipeline; and a radial recess configured to accommodate a sealing ring, wherein the chamfer extends at least between the annular bead and the radial recess.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
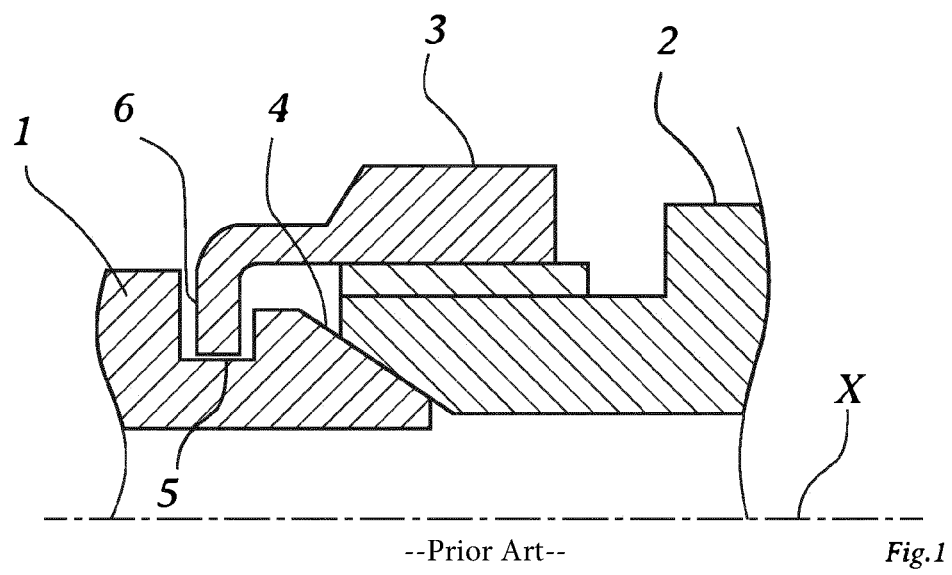
FIG. 1 shows a schematic illustration of a pipe screw connection according to the state of the art in a partial cut view.

In an embodiment, the present invention provides a formed pipe end-section with an adjusted geometry that overcomes drawback(s) of the state of the art, and which fits to the adapter counterpart according to the BS5200 dimensions.

In an embodiment, the present invention provides a pipe end-section of a pipeline for connecting the pipeline at an end. In an embodiment, the present invention provides a pipe screw-connection for reversibly connecting a pipeline having such a formed pipe end-section to an adapter.

The formed pipe end-section of a pipeline for connecting the pipeline at an end, according to the invention, comprises an annular bead with a first abutment face facing away from the end of the pipeline and a second abutment face facing towards the end of the pipeline, a chamfer reducing a diameter of the pipe end-section from the annular bead towards the end of the pipeline, and a radial recess for accommodating a circular sealing ring. The chamfer extends at least between the annular bead and the radial recess, which means that the chamfer may as well further extend on a side of the radial recess, which faces away from the annular bead, for example to the end of the pipe end-section.

The formed pipe end-section according to the invention has the advantage that the geometry may be formed by deforming an undeformed end-section of a pipe. The deformation is moderate such that the material flow is reduced. The material properties are thus enhanced.

According to a preferred embodiment the chamfer is arranged immediately adjacent to the annular bead. The annular bead preferably extends generally in a radial direction with respect to the pipe end-section.

According to a further preferred embodiment a conical face of the chamfer is arranged at an angle of 120 degree with respect to the second abutment face. The second abutment face is preferably arranged in a plane perpendicular to a longitudinal axis of the pipe end-section. The longitudinal axis is generally arranged in the flow direction of a medium flowing through the pipeline.

According to a further preferred embodiment the annular bead, the chamfer and/or the radial recess are formed by press-forming the end-section of the pipeline, particularly without machining.

According to a further preferred embodiment the formed pipe end-section further comprises a coupling nut, wherein the first abutment face is provided to be engaged by the coupling nut. Particularly preferably, the coupling nut is arranged to be screw-connected to an adapter.

According to a further preferred embodiment the second abutment face is provided for abutting a front face of an adapter, thus advantageously providing an additional sealing location when the adapter is connected to the formed pipe end-section.

According to a further preferred embodiment the formed pipe end-section further comprises a circular sealing ring accommodated in the radial recess, wherein the chamfer and the sealing ring are respectively provided to engage an inner cone of an adapter, the sealing ring advantageously providing an additional sealing location.

In an embodiment, the presented invention provides a pipe screw-connection for reversibly connecting a pipeline, which according to the invention comprises a formed pipe end-section, as referred to above, and an adapter. The adapter has a front face at a connecting end and an inner cone extending from the front face, the adapter forming a tubular member for passing through a medium.

According to a preferred embodiment of the pipe screw-connection, in a connected state the second abutment face abuts against the front face, thus sealing the connection in a first sealing area.

According to a further preferred embodiment of the pipe screw-connection, the chamfer of the pipe end-section engages with the inner cone of the adapter, thus aligning the pipe end-section and the adapter axially during a connection process, and, in a connected state, sealing the connection in a second sealing area.

According to a further preferred embodiment of the pipe screw-connection, the radial recess accommodates a circular sealing ring, the sealing ring sealingly engaging the inner cone of the adapter in a connected state to form a third sealing area.

The state of the art and the invention are now described with reference to the accompanying drawings. The illustration is exemplary and does not limit the scope of the invention.

FIG. 1 shows a schematic illustration of a standard BSP connection per British Standard BS5200 with sealing function at the cone in a partial cut view along a longitudinal axis X. As the connection is symmetrical with respect to the longitudinal axis X, only the upper half is displayed. The illustrated connection comprises two parts, the pipeline end 1 and the adapter 2, which achieve a sealing function over a 60 degree cone geometry between the formed pipeline-end and the adapter 2. A screw-connection coupling part 3, which is usually designed as a coupling nut, which can be screwed by way of an internal thread onto an external thread of the adapter 2, will further be referred to as coupling nut 3 or screw-nut 3. The metallic pipeline, which is to be connected has, at the connection end 1, a radially outwardly projecting annular geometry, which is formed by plastic deformation. The geometry comprises a 60 degree cone 4 and an annular groove 5 for securing the screw-nut 3, which has a ring 6 that is held form-fittingly in the longitudinal direction in the groove 5. Forming the geometry of the pipeline end 1 in respect of the BS5200 dimensions requires more steel material than the suitable tube sizes are offering. Additionally the material flow during the plastic deforming process degrades the material properties, such as tensile strength or pressure resistance.

Figure 2:
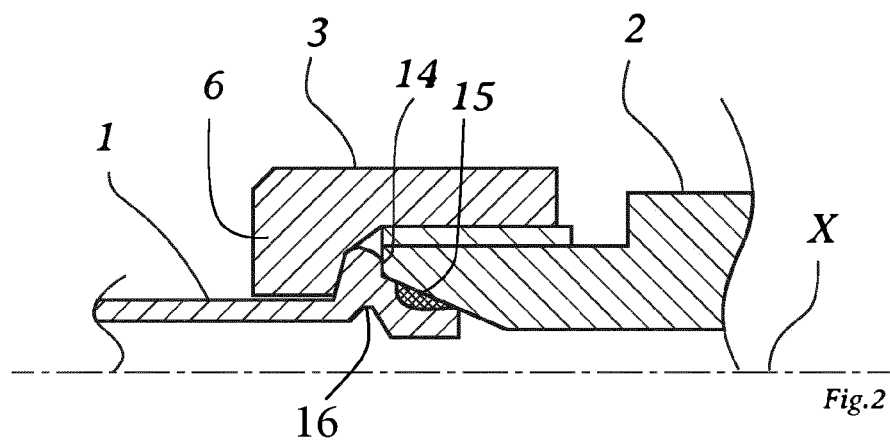
FIG. 2 shows a schematic illustration of an embodiment of a pipe screw connection according to the invention in a partial cut view.

FIG. 2 shows a schematic illustration of an embodiment of a pipe screw connection according to the invention in a partial cut view along the longitudinal axis X. As the connection is symmetrical with respect to the longitudinal axis X, only the upper half is displayed. The pipe screw connection according to the invention comprises two parts as well, the pipeline end 1 and the adapter 2. The adapter 2 is generally identical to the state of the art as shown in FIG. 1. It comprises the coupling nut 3 or screw-nut 3, which is screwed by way of an internal thread onto an external thread of the adapter 2. The metallic pipeline 1, which is to be connected comprises a formed pipe end-section according to the invention at an end.

Figure 3:
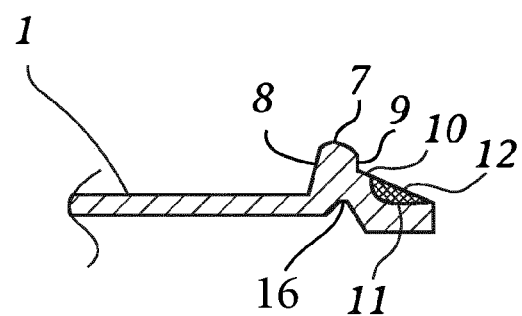
FIG. 3 shows the formed pipe end-section according to the invention, as a detail of the pipe screw connection of FIG. 2, alone.

The formed pipe end-section is shown in detail in FIG. 3. The following description thus refers to both FIGS. 2 and 3. The formed pipe end-section comprises an annular bead 7 with a first abutment face 8 facing away from the end of the pipeline 1 and a second abutment face 9 facing towards the end of the pipeline 1. The formed pipe end-section further comprises a chamfer 10 reducing a diameter of the pipe end-section from the annular bead 7 towards the end of the pipeline 1. Furthermore, the formed pipe end-section comprises a radial recess 11 for accommodating a circular sealing ring 12, wherein the chamfer 10 extends at least between the annular bead 7 and the radial recess 11. The formed pipe end-section comprises an inner recess 16 extending radially toward the annular bead 7. The ring 6 of the screw-nut 3 engages with the first abutment face 8 at the radial bead 8 to secure the formed pipe end-section 1 to the adapter 2.

In the depicted embodiment, the chamfer 10 is arranged immediately adjacent to the annular bead 7. A conical face of the chamfer 10 is arranged at an angle of 120 degree with respect to the second abutment face 9. If the screw connection according to the invention is in a connected state as depicted, the second abutment face 9 is abutting a front face 14 of the adapter 2, thus sealing the connection in a first sealing area. The sealing ring 12 is accommodated in the radial recess 11, so the chamfer 10 and the sealing ring 12 respectively engage the inner cone 15 of the adapter 2. The chamfer 10 and the inner cone 15 of the adapter 2 align the pipe end-section 1 and the adapter 2 axially during a connection process, and, in the connected state, seal the connection in a second sealing area. In the connected state, the sealing ring 12 sealingly engages the inner cone 15 of the adapter 2 to form a third sealing area.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 Pipeline, pipe end-section
2 Adapter
3 Connecting nut, screw-nut
4 Cone
5 Annular groove
6 Ring
7 Annular bead
8 First abutment face
9 Second abutment face
10 Chamfer
11 Annular recess
12 Sealing ring
14 Front face
15 Inner cone
X Longitudinal axis

The invention claimed is:

1. A formed pipe end-section of a pipeline for connecting the pipeline at an end, comprising:
    an annular bead with a first abutment face facing away from the end of the pipeline and a second abutment face facing towards the end of the pipeline;
    an inner recess extending radially toward the annular bead;
    a chamfer reducing a diameter of the pipe end-section from the annular bead towards the end of the pipeline;
    a radial recess configured to accommodate a sealing ring, wherein the radial recess is rounded and comprises a bottom which extends to the end of the pipeline; and
    wherein the chamfer extends at least between the annular bead and the radial recess,
    wherein the chamfer and the sealing ring are respectively configured to engage an inner cone of an adapter, and wherein the end of the pipeline abuts the inner cone of the adapter.

2. The formed pipe end-section according to claim 1, wherein the chamfer is arranged immediately adjacent to the annular bead.

3. The formed pipe end-section according to claim 1, wherein a conical face of the chamfer is arranged at an angle of 120 degrees with respect to the second abutment face.

4. The formed pipe end-section according to claim 1, further comprising a coupling nut, wherein the first abutment face is configured to be engaged by the coupling nut.

5. The formed pipe end-section according to claim 4, wherein the coupling nut is configured to be screw-connected to the adapter.

6. The formed pipe end-section according to claim 1, wherein the second abutment face is configured to abut a front face of the adapter.

7. The formed pipe end-section according to claim 1, wherein:
    the adapter has a front face at a connecting end, the inner cone extending from the front face at a connecting end and the adapter forming a tubular member configured to pass through a medium; and
    the pipeline is configured to be reversibly connected to the adapter.

8. The pipe screw-connection according to claim 7, wherein in a connected state the second abutment face abuts against the front face, thus sealing the connection in a first sealing area.

9. The pipe screw-connection according to claim 8, wherein the chamfer of the pipe end-section engages with the inner cone of the adapter, thus aligning the pipe end-section and the adapter axially during a connection process, and, in a connected state, sealing the connection in a second sealing area.

10. The pipe screw-connection according to claim 9, wherein the sealing ring sealingly engaging the inner cone of the adapter in a connected state to form a third sealing area.

11. The formed pipe end-section according to claim 1, wherein the bottom of the radial recess extends from the chamfer to the end of the pipeline.

* * * * *